(12) United States Patent
Kim et al.

(10) Patent No.: US 6,505,704 B2
(45) Date of Patent: Jan. 14, 2003

(54) ELECTRIC POWER STEERING SYSTEM

(75) Inventors: Seong Joo Kim, Ansan-si (KR); Seong Kyu Kim, Seoul (KR); Dai Jong Chung, Guri-si (KR); Wan Seop Kim, Pyungtaek-si (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 09/966,117

(22) Filed: Sep. 27, 2001

(65) Prior Publication Data

US 2002/0017422 A1 Feb. 14, 2002

(30) Foreign Application Priority Data

Jan. 12, 2000 (KR) .............................. 00-72538

(51) Int. Cl.$^7$ ................................. B62D 5/06
(52) U.S. Cl. ........................ 180/446; 701/41; 701/71
(58) Field of Search ................... 180/443, 446; 701/41, 42, 43, 71, 72, 73; 318/432

(56) References Cited

U.S. PATENT DOCUMENTS

| | | | |
|---|---|---|---|
| 4,992,944 A | * 2/1991 | Noto et al. | 364/424.05 |
| 5,828,973 A | * 10/1998 | Takeuchi et al. | 701/41 |
| 6,305,489 B1 | * 10/2001 | Kariatsumari | 180/422 |
| 6,349,789 B1 | * 2/2002 | Nakano et al. | 180/446 |
| 6,450,592 B1 | * 9/2002 | Nishizaki et al. | 303/155 |

* cited by examiner

*Primary Examiner*—Anne Marie Boehler
*Assistant Examiner*—Tony Winner
(74) *Attorney, Agent, or Firm*—Anderson Kill & Olick, P.C.

(57) ABSTRACT

An electric power steering system includes a torque detection unit, an anti-lock brake system electronic control unit (ABS ECU), an electric power steering control unit and an electric power steering motor. The torque detection unit senses a manual steering torque applied to a steering wheel and detects a braking power difference torque. The ABS ECU outputs an ABS operational signal which provides information on a sharp braking operation of the vehicle. The electric power steering control unit generates a motor current in response to the manual steering torque and outputs a modulated motor current if the ABS operational signal is provided. The electric power steering motor reduces unnecessary movements of the steering wheel caused by a difference in road surface frictional forces of the left and the right driving wheels based on the modulated motor current.

1 Claim, 1 Drawing Sheet

ELECTRIC POWER STEERING SYSTEM

FIELD OF THE INVENTION

The present invention relates to an electric power steering system of an automobile; and, more particularly, to an electric power steering system with an anti-lock brake system (ABS) capable of improving steering characteristics of a vehicle when the vehicle has a sharp braking on a road surface where left and right driving wheels have different road surface frictional forces.

BACKGROUND OF THE INVENTION

In general, in a reaction type electric power steering system, a steering effort required for a vehicle operator to steer a vehicle may be increased by increasing a pressure to a reaction member in proportion to a speed of the vehicle. Accordingly, the vehicle operator can operate a steering wheel with a relatively small steering effort when the vehicle is traveling at a low speed. However, when the vehicle is running at a high speed, a steering of the vehicle involves a comparatively large amount of steering effort of the vehicle operator.

An anti-lock brake system electronic control unit (ABS ECU) properly controls a brake pressure of driving wheels during a sharp braking to thereby prevent a risk that might be caused by a locking phenomenon of driving wheels.

However, when a frictional force between a left driving wheel and the road surface is different from that between a right driving wheel and the road surface during the sharp braking, the vehicle may be revolved so that the operator may hastily steer the vehicle. In such case, the vehicle is often over-steered, causing the vehicle operator to be at risk of a traffic accident.

In the conventional reaction type electric power steering system, when the vehicle operator suddenly brakes the vehicle and the ABS ECU generates an ABS operational signal, the information on the speed of the vehicle is fixed as one high value and accordingly the pressure applied to the reaction member is increased, resulting in an increase of the steering effort as well. Thus, a steering response to a specific steering action becomes smaller than that of a normal case and a stability of a vehicle behavior is secured.

However, this conventional art has certain drawbacks in that it is difficult to perform a minute tuning and steering effort cannot be infinitely increased on a slippery road surface. In order to overcome these drawbacks, an additional steering gear with a wide control range has been required. Further, there exists a high risk that the steering wheel is suddenly revolved due to a kick back of the driving wheels during the sharp braking, thereby making the confused vehicle operator more frightened.

SUMMARY OF THE INVENTION

It is, therefore, an object of the present invention to provide a motor control device for use in an electric power steering system capable of reducing unnecessary movements of a steering wheel caused by road interface frictions by controlling a driving current of an electric power steering motor depending on a braking power difference between the left and the right driving wheels of a vehicle when an anti-lock brake system (ABS) is operated.

In accordance with the present invention, there is provided an electric power steering system, including:

a torque detection unit for sensing a manual steering torque applied to a steering wheel of a vehicle and detecting a braking power difference torque representing a difference in braking powers between left and right driving wheels of the vehicle;

an anti-lock brake system (ABS) electronic control unit for outputting an ABS operational signal which provides information on a sharp braking of the vehicle;

an electric power steering control unit for generating a motor current in response to the manual steering torque provided from the torque detection unit and, if the ABS operational signal is provided, outputting a modulated motor current obtained by increasing or decreasing the motor current based on the braking power difference torque; and an electric power steering motor, which operates based on the modulated motor current provided from the electric power steering control unit, for reducing unnecessary movements of the steering wheel caused by a difference in road surface frictional forces of left and right driving wheels of the vehicle.

BRIEF DESCRIPTION OF THE DRAWINGS

The above and other objects and features of the present invention will become apparent from the following description of preferred embodiments of the present invention given in conjunction with the accompanying drawings, in which.

DETAILED DESCRIPTION OF THE PREFERRED EMBODIMENTS

Figure 1:
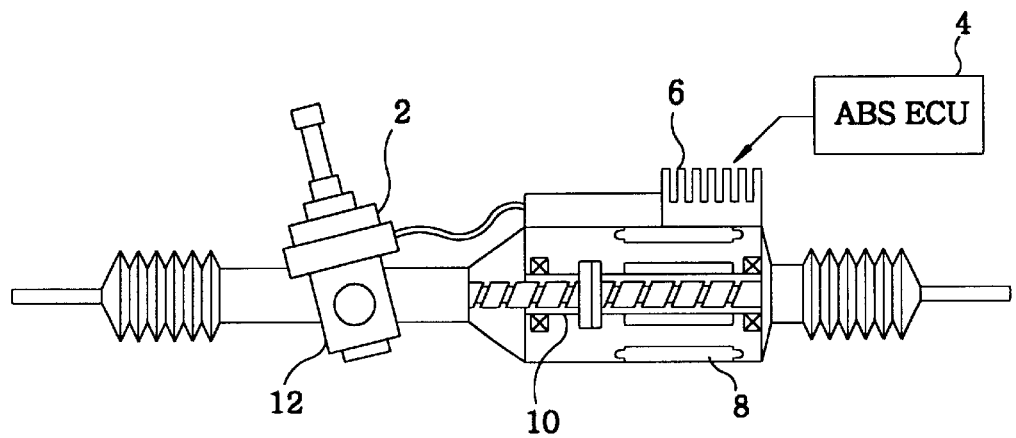
FIG. 1 is a schematic drawing for explaining an electric power steering system in accordance with an embodiment of the present invention.

Referring to FIG. 1, there is provided a schematic drawing of an electric power steering system in accordance with a preferred embodiment of the present invention. The electric power steering system includes a torque detection unit 2, an anti-lock brake system electronic control unit (ABS ECU) 4, an electric power steering control unit 6, an electric power steering motor 8, a ball screw gear 10 and a rack and pinion gear 12.

The torque detection unit 2 detects both a manual steering torque generated by a steering action of a vehicle operator and a braking power difference torque produced by different braking powers of left and right driving wheels, and then transmits the detected information on the manual steering torque and the braking power difference torque to the electric power steering control unit 6.

The ABS ECU 4 is used to prevent a locking phenomenon of the driving wheels by controlling a brake pressure of the left and the right driving wheels when a road surface frictional force between the left driving wheel and the road is different from that between the right driving wheel and the road. To be specific, during the sharp braking, the ABS ECU 4 generates an ABS operational signal and provides the generated signal to the electric power steering control unit 6.

The electric power steering control unit 6 generates a motor current in response to a manual steering torque provided from the torque detection unit 2. When the ABS operational signal is provided from the ABS ECU 4, the electric power steering control unit 6 generates a modulated motor current by increasing or decreasing the motor current corresponding to the manual steering torque in response to the braking power difference torque. Thus modulated motor current, i.e., the increased or decreased motor current in response to the braking power difference torque, is supplied to the electric power steering motor 8.

The electric power steering motor 8 operates depending on the modulated motor current provided from the electric power steering control unit 6 to assist the vehicle operator to steer the vehicle.

The ball screw gear 10 functions as a reduction gear to generate a torque of the electric power steering motor 8. Reference number 12 refers to a rack and pinion gear.

Figure 2:
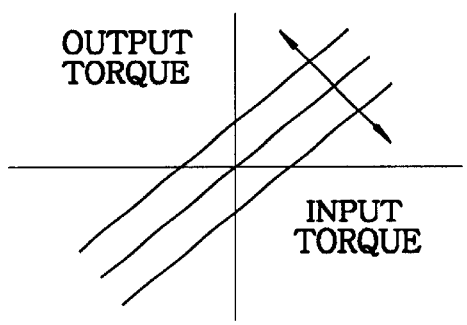
FIG. 2 shows a relationship between an input torque generated by a steering action of a vehicle operator and an output torque according to a current applied to an electric power steering motor.

FIG. 2 shows a relationship between a manual input torque according to a steering action of a vehicle operator and an output torque proportionate to the modulated motor current applied to the electric power steering motor 8. In case a vehicle operator suddenly brakes a vehicle and an ABS operational signal is generated, the relationship between the input torque and the output torque is determined depending on whether or not the braking power difference torque is 0. Specifically, if the braking power difference torque is 0, the output torque becomes 0 when the input torque is 0, as shown in a central line of FIG. 2. However, if the braking power difference torque is not 0, the output torque is adjusted not to be 0 even though the input torque is 0, as can be seen from FIG. 2. Driving wheels of the vehicle are set to be shifted to the left or the right depending on the information on left and right road surface conditions which can be estimated from the braking power difference torque between the left and the right driving wheels generated in the ABS ECU 4. Accordingly, the same effects may be obtained as in a case where a certain amount of motor current is generated in the reaction type electric power steering system even though the vehicle has a sharp braking on a road surface where the left and the right driving wheels have different road surface frictional forces (split-$\mu$). For example, it is assumed that about 10 A of motor current is needed in the reaction type electric power steering system so as to prevent the vehicle from revolving due to a yawing phenomenon and the vehicle operator needs to apply 40 kg weight cm of manual steering torque in order to obtain the required motor current of about 10 A in the reaction type electric power steering system. However, if a predetermined amount of motor current, e.g., 5 A of motor current, is basically provided in accordance with the present invention, the vehicle operator only has to apply 20 kg weight cm of manual steering torque so as to generate the required motor current, i.e., 5 A. The like result is obtained even though the road surface is in a contrary condition.

Figure 3:
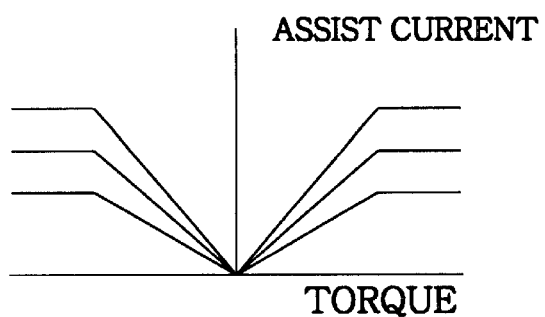
FIG. 3 explains a relationship between a torque generated by a steering action of a vehicle operator and a current applied to an electric power steering motor.

FIG. 3 shows a relationship between a manual steering torque according to a steering action of a vehicle operator and a motor current applied to an electric power steering motor 8, wherein a top line in FIG. 3 represents a case where the vehicle is traveling at a low speed while a bottom line represents another case in which the vehicle is traveling at a high speed.

If a sharp braking operation of a vehicle is terminated and thus no ABS operational signal is generated from the ABS ECU 4, output characteristics of the electric power steering system also return to a previous normal state in accordance with the present invention.

As described above, although a braking power of a vehicle is changed because of a difference in road surface frictional forces of left and the right driving wheels and thus the vehicle is about to revolve to a direction of a high braking power, an anti-lock brake system in accordance with the present invention is used to restrain the vehicle from revolving and to reduce unnecessary movements of the steering wheel, thereby allowing a vehicle operator to steer stably.

While the invention has been shown and described with respect to the preferred embodiments, it will be understood by those skilled in the art that various changes and modifications may be made without departing from the spirit and scope of the invention as defined in the following claims.

What is claimed is:

1. An electric power steering system, comprising:

a torque detection unit for sensing a manual steering torque applied to a steering wheel of a vehicle and detecting a braking power difference torque representing a difference in braking powers between left and right driving wheels of the vehicle;

an anti-lock brake system (ABS) electronic control unit for outputting an ABS operational signal which provides information on a sharp braking of the vehicle;

an electric power steering control unit for generating a motor current in response to the manual steering torque provided from the torque detection unit and, if the ABS operational signal is provided, outputting a modulated motor current obtained by increasing or decreasing the motor current based on the braking power difference torque; and an electric power steering motor, which operates based on the modulated motor current provided from the electric power steering control unit, for reducing unnecessary movements of the steering wheel caused by a difference in road surface frictional forces of left and right driving wheels of the vehicle.

* * * * *